United States Patent
Freneau et al.

(10) Patent No.: US 11,578,805 B2
(45) Date of Patent: Feb. 14, 2023

(54) APPARATUS FOR CONDUCTING A HYDRAULIC PROOF TEST

(71) Applicant: Electricite de France, Paris (FR)

(72) Inventors: Coralie Freneau, Saint Avertin (FR); Fabien Houssay, Haute-Goulaine (FR); Rudolph Baranger, Bricquebec (FR); Axel Tabutin, La Glacerie (FR); Laurent Soriano, Cherbourg (FR); Antoine Ollivier, Equedreville-Haineville (FR)

(73) Assignee: Electricite de France

( * ) Notice: Subject to any disclaimer, the term of this patent is extended or adjusted under 35 U.S.C. 154(b) by 0 days.

(21) Appl. No.: 17/620,883

(22) PCT Filed: Jun. 16, 2020

(86) PCT No.: PCT/EP2020/066574
§ 371 (c)(1),
(2) Date: Dec. 20, 2021

(87) PCT Pub. No.: WO2020/254298
PCT Pub. Date: Dec. 24, 2020

(65) Prior Publication Data
US 2022/0260467 A1 Aug. 18, 2022

(30) Foreign Application Priority Data
Jun. 21, 2019 (FR) ........................... 1906744

(51) Int. Cl.
*F16K 3/18* (2006.01)
*F16K 37/00* (2006.01)
(Continued)

(52) U.S. Cl.
CPC .............. *F16K 3/188* (2013.01); *F16K 3/182* (2013.01); *F16K 37/0091* (2013.01); *F16L 55/105* (2013.01); *G01M 3/26* (2013.01)

(58) Field of Classification Search
CPC .......... G01M 3/02; G01M 3/022; G01M 3/04; G01M 3/086; G01M 3/144; G01M 3/184;
(Continued)

(56) References Cited

U.S. PATENT DOCUMENTS 3,575,377 A * 4/1971 Carlton ................... F16K 3/188
251/327
3,833,020 A * 9/1974 Smith ..................... F16K 3/188
166/55
4,244,557 A * 1/1981 Polhede .................. F16K 51/02
251/368
(Continued)

FOREIGN PATENT DOCUMENTS

CN 202691105 U 1/2013
CN 106090273 A 11/2016
(Continued)

OTHER PUBLICATIONS

International Search Report for Application No. PCT/EP2020/066574 dated Oct. 5, 2020, 2 pages.

*Primary Examiner* — Hailey K. Do
(74) *Attorney, Agent, or Firm* — Lerner, David, Littenberg, Krumholz & Mentlik, LLP

(57) ABSTRACT

The invention relates to a hydraulic proof test assembly comprising at least a valve (1) with parallel seats (102). It comprises:
a shut-off member (2) with parallel plates (20, 21), connected by connecting means for regulating their separation, to make them go from a first position in which this separation is sufficient to enable the shut-off member (2) to be introduced into said valve (1) to a second position where
(Continued)

said separation is greater, this separation making it possible to apply them firmly against said parallel seats (102);

a device (3) for inserting said shut-off member (2) into said valve (1) which comprises at least a "U" shaped tool, configured to be introduced into said valve (1), its parallel arms forming guides, while its base forms a support for retaining said shut-off member (2);

a "dummy stem" (4).

11 Claims, 19 Drawing Sheets

(51) Int. Cl.
*F16L 55/105* (2006.01)
*G01M 3/26* (2006.01)

(58) Field of Classification Search
CPC ....... G01M 3/224; G01M 3/2676; F16K 3/18; F16K 3/188
See application file for complete search history.

(56) References Cited

U.S. PATENT DOCUMENTS

| | | | | |
|---|---|---|---|---|
| 4,407,171 | A | * | 10/1983 | Hasha .................. G01M 3/022 73/49.1 |
| 4,916,938 | A | * | 4/1990 | Aikin .................. G01M 3/2876 73/40 |
| 5,083,748 | A | * | 1/1992 | Batzer .................... F16K 3/186 251/167 |
| 9,080,703 | B2 | * | 7/2015 | Legendre .............. F16L 37/002 |
| 2015/0345660 | A1 | * | 12/2015 | Kho ........................ F16K 47/00 251/326 |
| 2022/0057017 | A1 | * | 2/2022 | Poon ........................ F16K 3/14 |

FOREIGN PATENT DOCUMENTS

| | | |
|---|---|---|
| CN | 205908770 U | 1/2017 |
| DE | 1450290 A1 | 2/1969 |
| FR | 1353573 A | 2/1964 |
| FR | 2751006 A1 | 1/1998 |
| FR | 2989146 A1 | 10/2013 |
| GB | 1126487 A | 9/1968 |
| WO | 0003172 A1 | 1/2000 |

* cited by examiner

APPARATUS FOR CONDUCTING A HYDRAULIC PROOF TEST

CROSS-REFERENCE TO RELATED APPLICATIONS

The present application is a national phase entry under 35 U.S.C. § 371 of International Application No. PCT/EP2020/066574 filed Jun. 16, 2020, which claims priority from French Application No. 1906744 filed Jun. 21, 2019, all of which are incorporated herein by reference.

FIELD OF THE INVENTION

The present invention pertains to the field of conducting a hydraulic proof test, that is to say a pressure resistance test, of a hydraulic installation comprising at least a valve with parallel seats.

TECHNOLOGICAL BACKGROUND OF THE INVENTION

Numerous industrial installations comprise capacities (tanks, vessels, exchangers, etc.) coupled to pipes (pipework) for the passage of fluids, liquid or gaseous, often pressurised.

In order to guarantee a reliable and safe operation of these installations, the maintenance of such systems requires conducting pressure resistance tests regularly and the regulations governing pressurised apparatus further imposes conducting hydraulic proof tests periodically.

In the remainder of the text, "pressure resistance", will be taken to mean the ability to withstand the mechanical stresses that such pressurisation produces which can lead to the deformation of the components of said industrial installations, loss of integrity of the mechanical connections of said components and their loss of leak tightness.

To conduct pressure resistance tests or hydraulic proof tests of tanks, vessels, or any other type of capacity, it is necessary to modify the configuration of the installation to create a test or proof "bubble", that is to say a closed circuit enabling the pressurisation of the capacity with a view to its technical evaluation.

For the creation of this closed circuit, it is thus necessary to be able to shut off each of the inlets/outlets of the vessel, notably when they are coupled to a pipe, in order to isolate the inner volume of the vessel.

Venting points, that is to say vents, are provided to make it possible to expel the air present in the equipment and pipework, and to guarantee the stabilisation of the pressure during the hydraulic proof test.

A test pump is used to manage the filling and pressure build up, the presence of a manometer making it possible to guarantee that the test pressure has been reached. In certain cases, tests or proofs are for example carried out with demineralised water at ambient temperature.

To create the hydraulic proof test bubble, it is possible to rely on bolted assemblies existing on the installation using shut-off members suited for the isolation of the vessel or the pipe. However, in industries using so-called hazardous fluids (toxic, inflammable, explosive, etc.) or hot fluids (for example steam), the capacities and pipework are exempt of flanges which could have made it possible, after dismantling, to install bolted plugs (blind holes, solid flanges), enabling their shut off.

Thus, it is generally necessary to cut the pipe and to weld a shut-off member at the level of the cut section of the pipe.

Unfortunately, such a technique for shutting off pipes has a large number of drawbacks.

Firstly, such a solution involves a complex implementation, generating an intervention of long duration, necessitating rare specific human resources (welders, controllers, etc.) and considerable material logistical requirements (gantries, scaffolding, airlocks, lagging removal system, etc.).

The intervention also comprises risks of important implementation contingencies (defects, faulty work, etc.). In addition, the intervention requires the supply of replacement parts (welded shut-off devices, pipework elements to be returned to compliance, etc.) which are expensive and for which the procurement lead times are long, given their specific technical characteristics. Welded shut-off devices have a limited lifetime due to the cuts made, such that this requires regular new procurements.

Finally, the implementation of this solution on certain installations usually requires conducting specific controls, such as for example non-destructive controls of the type of those that employ gamma rays, complete controls furthermore, if needs be, through the establishment of an administrative dossier defined by the regulations in force. These said controls have, among others risks inherent to welding, radiological risks leading to the putting in place of extended and specific marked off areas, which imposes the stopping of activities underway in the vicinity of the gamma shots.

One solution for avoiding these drawbacks linked to the use of welded shut-off members, consists in using mechanical or inflatable shut-off devices and positioning them in the pipes to shut them off. Depending on the configuration, several types of shut-off members may be used.

Thus, the mechanical shut-off members described in the document FR2989146 are known. These shut-off members of large dimensions are assembled inside pipes, which enables their putting in place despite the fact that access to the pipework takes place through orifices of smaller dimensions than the diameter of the pipe. These shut-off members require a nearby access to enable the instrumentation that will serve for the transmission of measurements for the purposes of checking and controlling their leak tightness during the hydraulic proof test.

Inflatable shut-off members such as those described in FR2751006 are also known. These shut-off members require a nearby access to enable the supply and to guarantee their resistance in the pipe during the hydraulic proof test and if necessary to regulate their inflation pressure. Their application has technical limits due to the configuration of the targeted industrial installations.

There are also mechanical shut-off members such as those of the document WO00/03172. These shut-off members have the drawback of requiring cutting the pipe that has to be shut off before being put in place. The drawbacks linked to welding works are reduced but are not eliminated since they remain present when the installations are returned to compliance.

What is more, these shut-off members, mechanical or inflatable, whether they require the cutting of the pipework or not, have the drawback of requiring straight lengths of sufficient dimensions in order to be installed. In addition, said lengths must be exempt of surface defects, accessible and their environment must enable the handling of the shut-off members, which is not always the case.

When the installation so allows, it is possible to rely on the pipework members associated with the vessel at the level of the inlets/outlets and dimensioned to withstand pressurisation during the hydraulic tests or proof tests. However, a simple verification of the correct operation of each pipework member before hydraulic tests or proof tests does not make it possible to guarantee the perfect leak tightness necessary for these, especially since the valves are designed with a "leakiness" coefficient according to design standards such as the NF E29-311-1, NF EN 12266-1 of 2012 May 1(year-month-day) withstanding for example a leakage rate of 10.5 mm3/s for valves of ND (nominal diameter) equal to 350 mm, of quality required for said installations.

For valves with parallel seats, an internal intervention, that is to say the removal of internal elements (namely the stem and the gates) to enable the expertise which consists in a control of the gates/seats spans then, if necessary, their bedding in, may improve the situation but does not guarantee systematically the leak tightness necessary for the validation of the hydraulic proof tests.

Another drawback is the duration of these works which require skills rare in pipework often prioritised over other activities. In addition, in the event of a contingency, the intervention may require the supply of replacement parts for which the procurement lead times are important. Yet another drawback is the multiplication of works on valves not being the subject of a preventive maintenance programme.

When it is conclusive, the conducting of an inter gate test (abridged as IGT) of the valve upstream of the hydraulic proof test makes it possible to guarantee leak tightness under the test conditions.

For this test, the inter gate space and the upper space of the valve are filled with water and built up in pressure before the test in order to check the upstream/downstream leak tightness of the gates on the seats.

When this test is not conclusive, tooling may be installed instead of the gates making it possible to guarantee the leak tightness of the valve. The bonnet, the stem and the gates of the valve are then dismantled to enable the putting in place of suitable shut-off tooling.

Few toolings meeting this need exist on the market.

One solution used in industry is the putting in place of shut-off members with parallel plates with one or several screws of which the position is adjustable thanks to a nut/lock nut system.

Unfortunately, this solution has a large number of drawbacks.

Firstly, the handling of the tooling is difficult and hazardous. The tooling is heavy and the introduction of hands into the body of the valve is necessary, the adjustment being manual.

Next, existing shut-off members are specific to a technology and a valve dimension, which requires reworking the design and calculation notes for each new valve encountered, knowing that no toolings exist suited to valves of which the distances between seats are small.

In addition, existing shut-off members do not make it possible to expel the air contained in the upper parts of the equipment and capacities.

Hence, these toolings are very uncommon and in the majority of cases, in the event of faulty inter gate test, the putting in place of a welded shut-off device upstream of the valves is favoured to make the hydraulic proof tests safe. And the aforementioned drawbacks of these welded devices are again encountered.

Among the different existing structures of valves with parallel seats, some could respond to a part of the problem encountered.

Thus, parallel seat valve structures of which a first plate is solid, while the second plate is apertured are known. A spring presses the two plates against the seats of the pipe.

Reference may be made in this respect to the documents CN205908770, CN106090273 and CN202691105 for example.

In all of the devices described in these documents, shut-off is achieved by an in-place device actuated by a stem, the stem not being able to be disconnected.

The device is positioned in a given valve and cannot be displaced to another of different dimensions and design. It cannot be adjusted in diameter or bulk.

The device only operates in one direction in the body of the valve (presence of a single span), such that it does not make it possible to ensure leak tightness in the case of an HPT (hydraulic proof test) with a pressure applied in the opposite direction, in operation.

The aim of the present invention is to provide a solution to these problems.

In other words, it aims to propose an assembly of elements that can make it possible to conduct a hydraulic proof test, that is to say a pressure resistance test, of a hydraulic installation comprising at least a valve with parallel seats, being able to be introduced, removed and put in place on demand, of simple design and of which the implementation is easy, including by first responders.

SUMMARY OF THE INVENTION

Thus, the present invention essentially pertains to an assembly for conducting a hydraulic proof test, that is to say a pressure resistance test, of a hydraulic installation comprising at least a valve with parallel seats, the body of this valve having been stripped beforehand of its actuating stem, its parallel gates and the bonnet supporting said actuating stem, thus freeing an opening for accessing said parallel seats, characterised by the fact that it comprises:
    a shut-off member with parallel plates, one being apertured and the other being solid, these plates being connected by connecting means making it possible to regulate their mutual separation, so as to be able to make it go from a first so-called "retracted" position in which this separation is sufficient to enable the shut-off member to be introduced into said valve via said opening, to a second so-called "expanded" position, in which said separation is greater than that of the plates in said first position, this separation making it possible to apply them firmly against said parallel seats;
    a device for inserting and supporting said shut-off member inside said valve which comprises at least a tool designated "inner tool" which has a general "U" shape and is configured to be introduced into said valve, the parallel arms of this "U" shaped tool forming guides for the introduction and the removal of said shut-off member, while its base forms a support for retaining said shut-off member with a view to the application of its parallel plates against said parallel seats;
    a "dummy stem", that is to say a sealing equipment configured to close in a leak tight manner said valve after said support bonnet back in place.

According to other non-limiting and advantageous characteristics of the invention, taken alone or according to any combination of at least two thereof:
    said parallel plates are dismantlable and interchangeable;
    said connecting means connecting said plates of the shut-off member comprise on the one hand at least a spring configured to bring said plates into said second position, and on the other hand at least a jack controllable on demand, to force said plates to occupy said first position against the action of said spring;

said connecting means connecting said plates of the shut-off member comprise on the one hand at least a spring configured to bring said plates into said first position and on the other hand at least a jack controllable on demand, to force said plates to occupy said second position against the action of said spring;

said connecting means connecting said plates of the shut-off member comprise a set of connecting rods hinged on the one hand on a first plate and on the other hand on a second plate;

each of said connecting rods is hinged on one of said plates via a sliding pivot link;

said insertion and support device also comprises a tool designated "external tool", configured to be positioned on the seal plane of said bonnet, around said opening and to enable the centring of said "inner tool";

said insertion and support device also comprises a pair of external guiding extensions, configured to be positioned on said "external tool", in the continuation of the arms of said "inner tool";

said "dummy stem" is of the gland or autoclave type;

said "dummy stem" is provided with a vent line;

said "dummy stem" is provided with instrumentation means.

BRIEF DESCRIPTION OF THE DRAWINGS

Other characteristics and advantages of the invention will become clear from reading the detailed description that follows. It will be made with reference to the appended drawings in which.

DETAILED DESCRIPTION OF THE INVENTION

An aim of the present invention is to propose a shut off device for valves with parallel seats making it possible to resolve at least one of the drawbacks cited in the introduction of the present application.

In particular, an aim of the present invention is to propose a shut-off device suited to all dimensions and all manufacturers of valves with parallel seats, thus making it possible to respond to the whole range of needs for hydraulic proof tests of equipment and capacities, notably of nuclear power plants.

Figure 1:
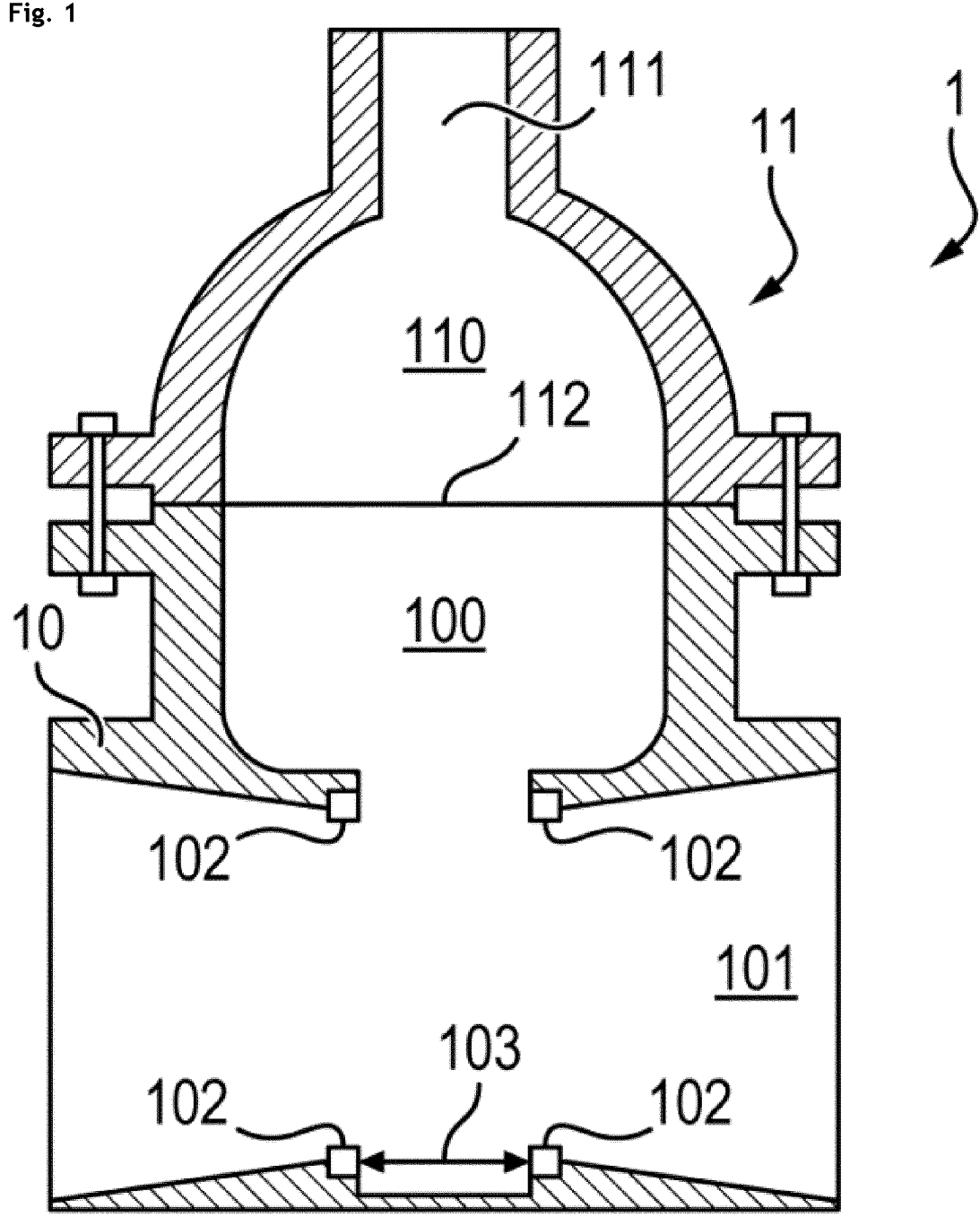
FIG. 1 is a schematic view, along a vertical sectional plane, of a known parallel seat valve structure, on which it is proposed to carry out a limit hydraulic proof test (pressure resistance test)

Before going into the detail of what composes the assembly according to the present invention, reference will be made to appended FIG. 1 in which is represented a known structure of valve 1 with parallel seats, on which it is proposed to carry out a hydraulic proof test (pressure resistance test).

This valve 1 comprises a body 10 surmounted by a bonnet 11, which has an upper opening 111. This bonnet 11 defines an inner space 110. The reference 112 designates the seal plane of the latter.

The body 10 defines an upper space 100 of vertical orientation which is situated exactly in the continuation of the aforesaid space 110. The space 100 communicates through its lower part with a lower space of horizontal orientation 101 which is the place of passage of the fluid through the valve 1.

The reference 102 designates the two parallel seats against which bear, in normal times, the gates of this valve. Finally, the reference 103 designates the distance between the two seats 102.

As has been described previously, the assembly according to the present invention comprises a shut-off member with parallel plates.

Figure 2:
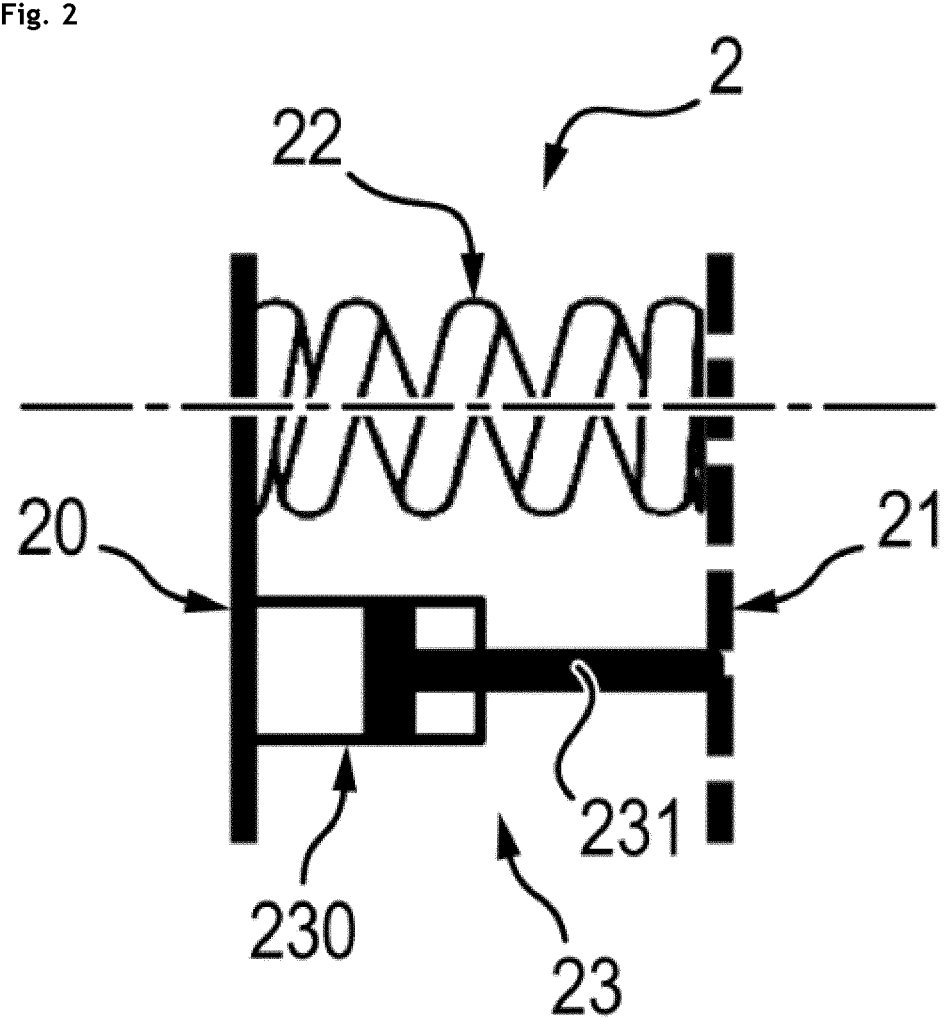
FIG. 2 is a schematic front view of a shut-off member with parallel plates which forms part of the assembly according to the present invention.
Figure 3:
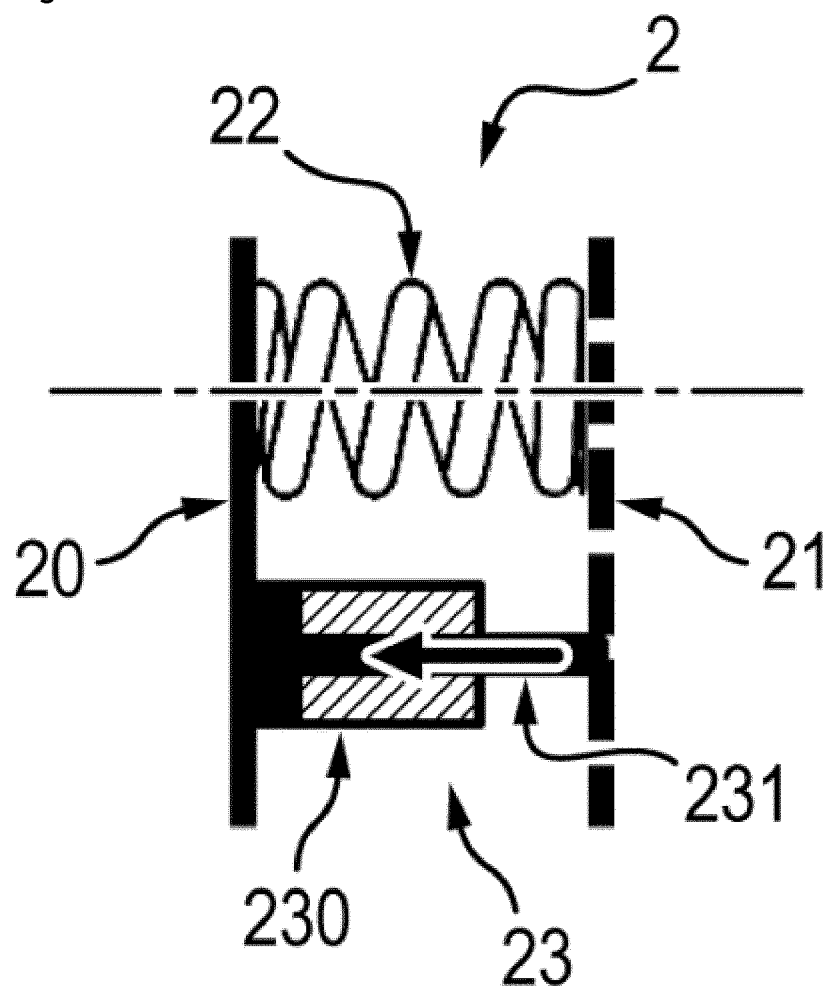
FIG. 3 is a view of the shut-off member of the preceding figure, in a first position.
Figure 4:
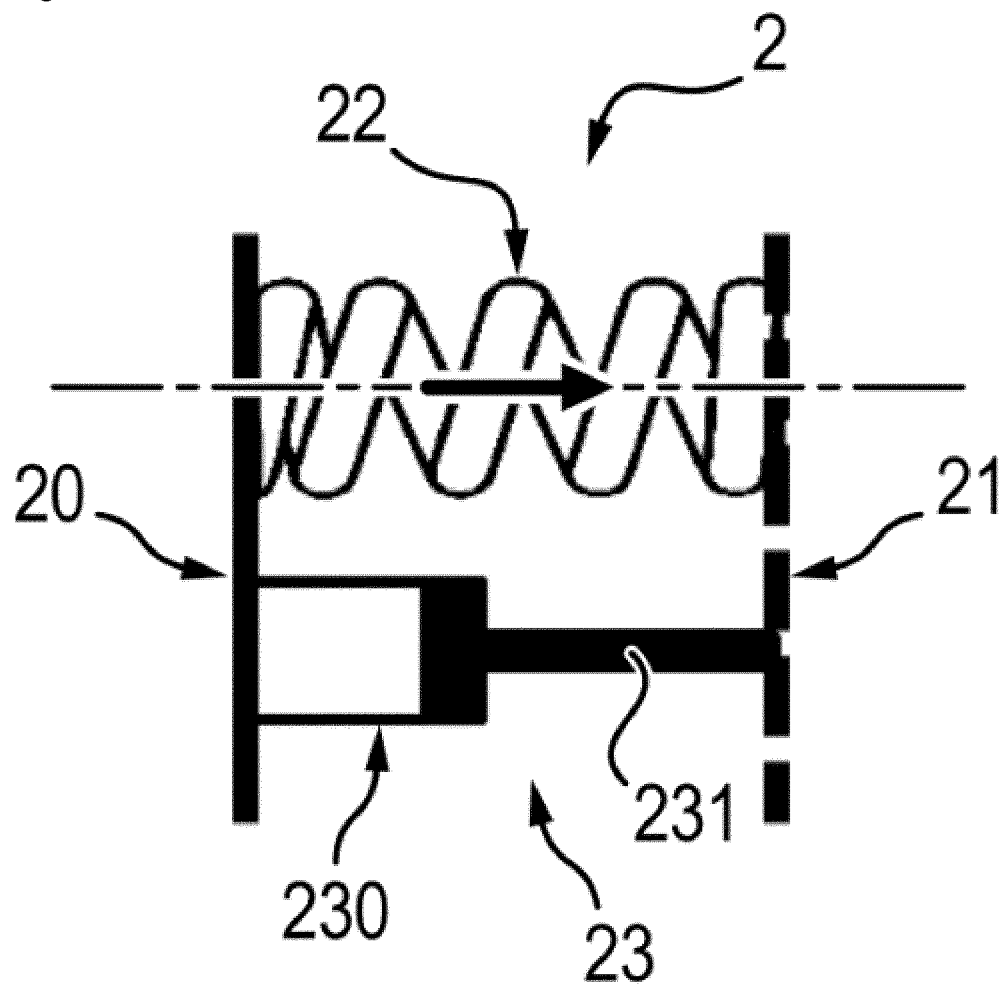
FIG. 4 is a view of the shut-off member of FIG. 2, in another position.
Figure 5:
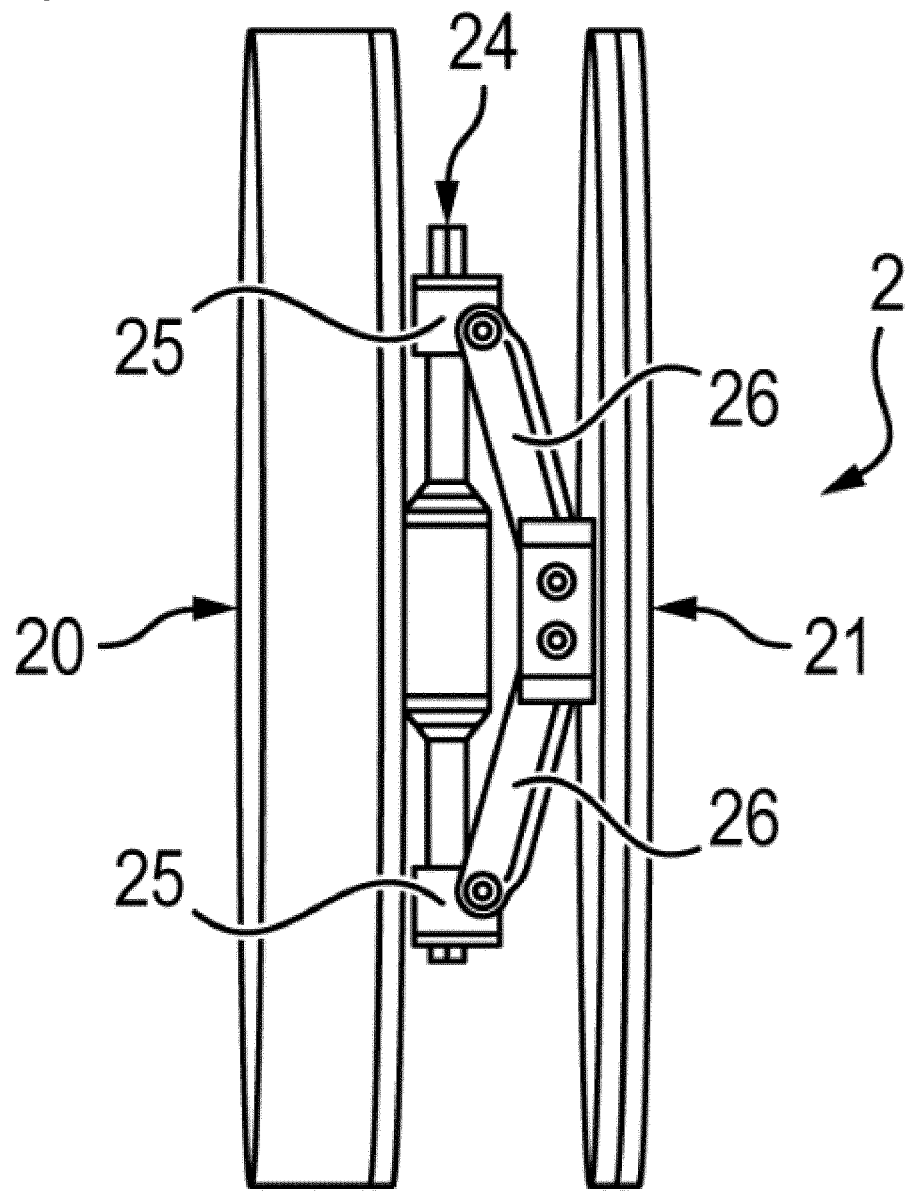
FIG. 5 is a front view of an alternative of the shut-off member with parallel plates illustrated previously.
Figure 6:
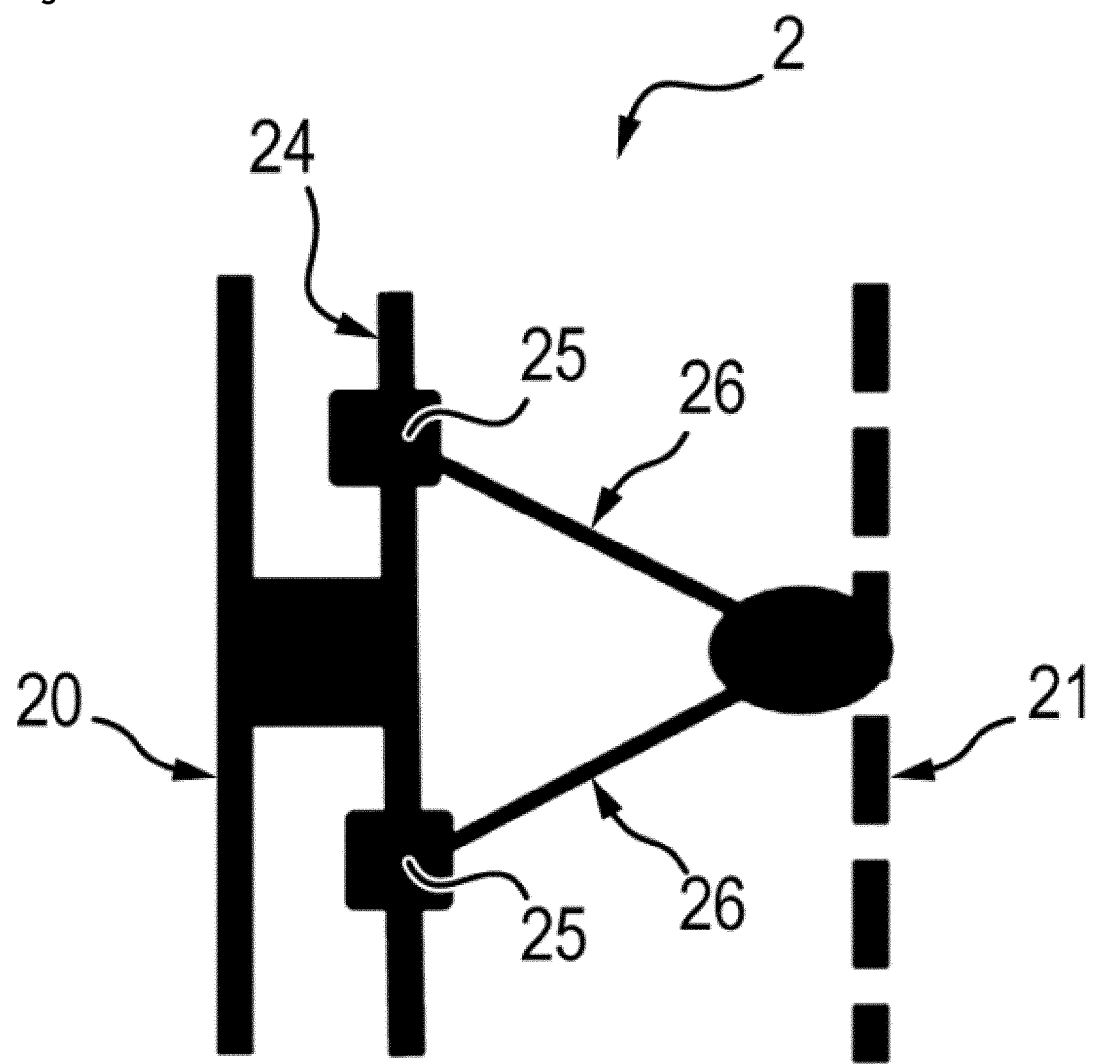
FIG. 6 is a schematic front view of the shut-off member of FIG. 5.

A first embodiment thereof is shown in FIGS. 2 to 4.

This shut-off member 2 comprises two parallel plates 20 and 21 of identical shape, one 20 being solid, while the second 21 is apertured. These plates, of general disc shape, have on their outer face (that is to say that which is turned in the direction opposite the other plate) a peripheral seal, not represented. Preferentially, these plates are provided to be dismantlable and interchangeable.

These plates are connected by connecting means making it possible to regulate their mutual separation.

In this case, we are dealing here with at least a helicoidal spring 22 and a jack 23, which are arranged one beside the other, that is to say in parallel.

The two opposite ends of the spring 22 are fixed on the faces facing the plates 20 and 21. The body 230 of the jack is fixed to the plate 20, while the free end of its stem 231 is fixed to the plate 21. Obviously, a reverse mounting may be envisaged.

In this embodiment, it is envisaged that the spring 22 naturally tends to expand, so as to increase the mutual separation between the plates 20 and 21. Under these conditions and as shown in FIG. 3, it is necessary to control the jack 23, so as to command the retraction of its stem 231, against the spring 22 to adjust to the minimum the space between the plates 20 and 21.

The jack 23 is preferentially supplied with air but may also be supplied with water in the event of unavailability of the air network. In FIG. 3, the shut-off member 2 is represented in retracted position, the compressed air being present in the cage of the jack, while in FIG. 4 the shut-off member is in expanded position, and the air inlet is disconnected.

Conversely, in an alternative not illustrated here, the spring may be provided to force the two plates to come close to one another, the jack then being controlled on demand to force the plates to move away from one another.

A second embodiment of the shut-off member 2 is presented in FIGS. 5 to 8.

In these figures, the parts bearing the same references as those of FIGS. 2 to 4 are identical.

The means which make it possible to modulate the separation between the plates 20 and 21 are here exclusively mechanical.

Thus, the solid plate 20 is coupled to a helicoidal screw 24 on which are arranged two sliding pivots 25. Furthermore, on each of these pivots 25 is hinged a connecting rod 26. The opposite ends of these connecting rods are practically contiguous and are hinged for their part on the plate 21.

Figure 7:
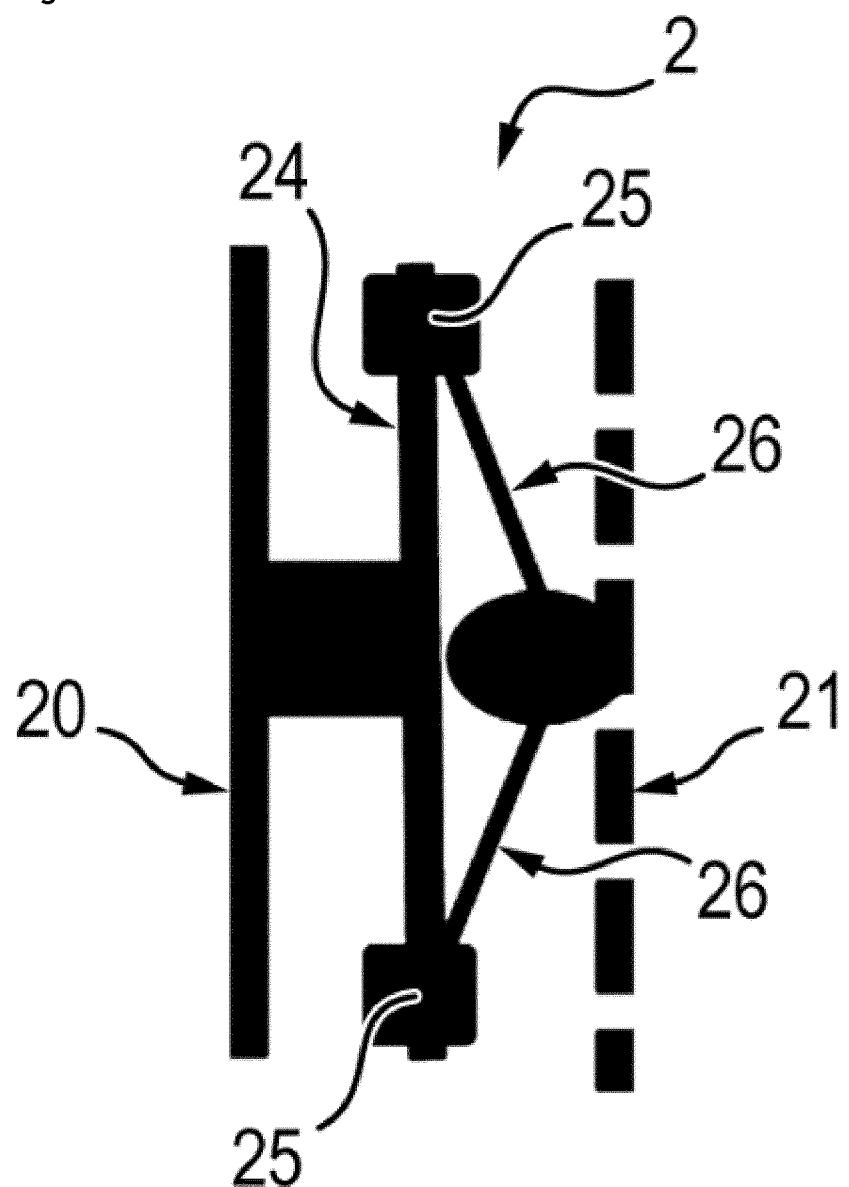
FIG. 7 is a view of the shut-off member of the preceding figure, in a first position.
Figure 8:
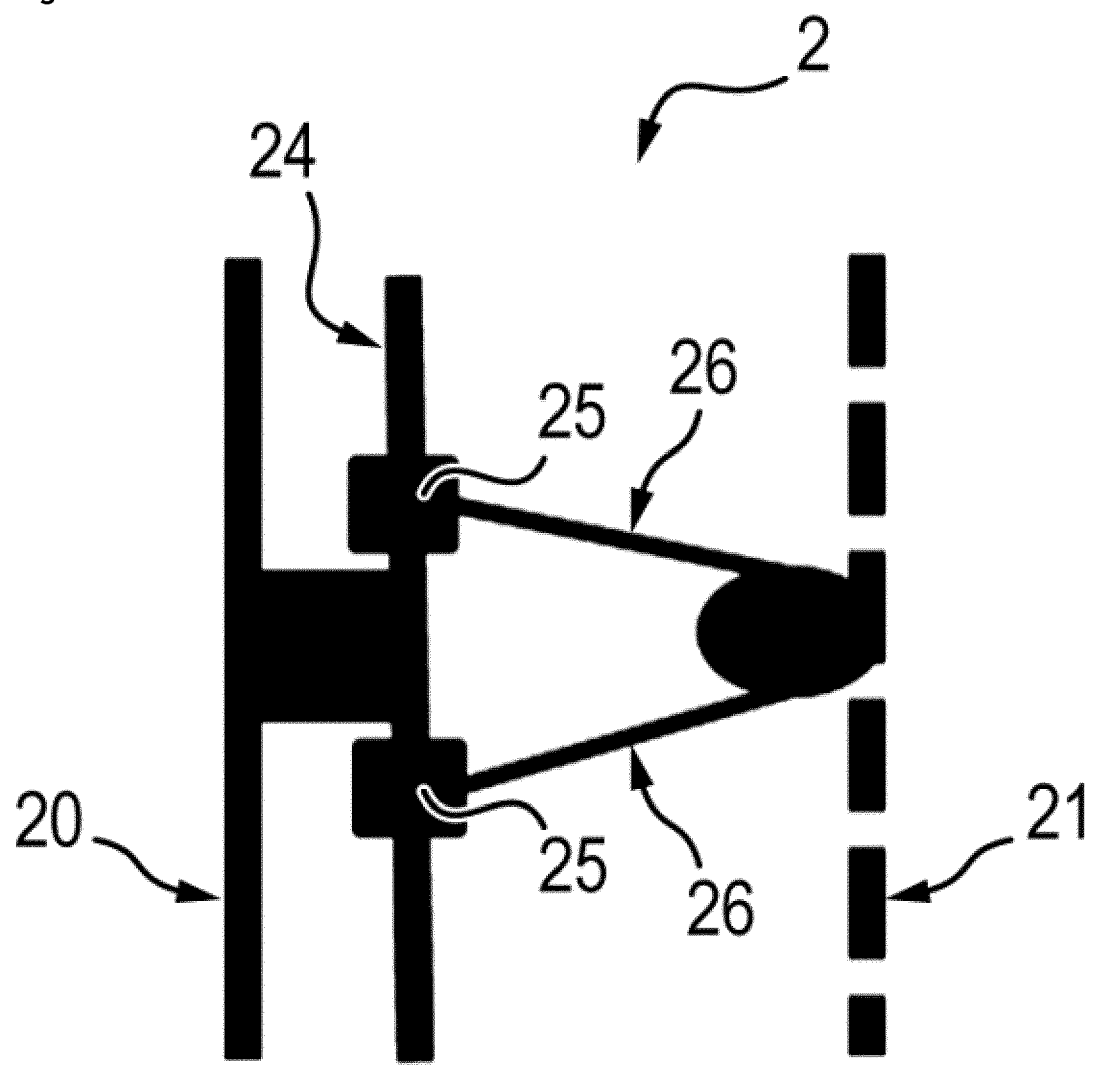
FIG. 8 is a view of the shut-off member of FIG. 6, in another position.

In these conditions and as shown particularly in FIGS. 7 and 8, by actuating the helicoidal screw 24 in one direction or another, it is going to be possible to adjust the separation between the plates 20 and 21.

Whatever the embodiment that is considered, the shut-off member 2 is going to be able to adopt a "retracted" position in which the separation between the plates 20 and 21 is minimal and is benefitted from to enable its introduction into a valve structure to shut off.

Figure 9:
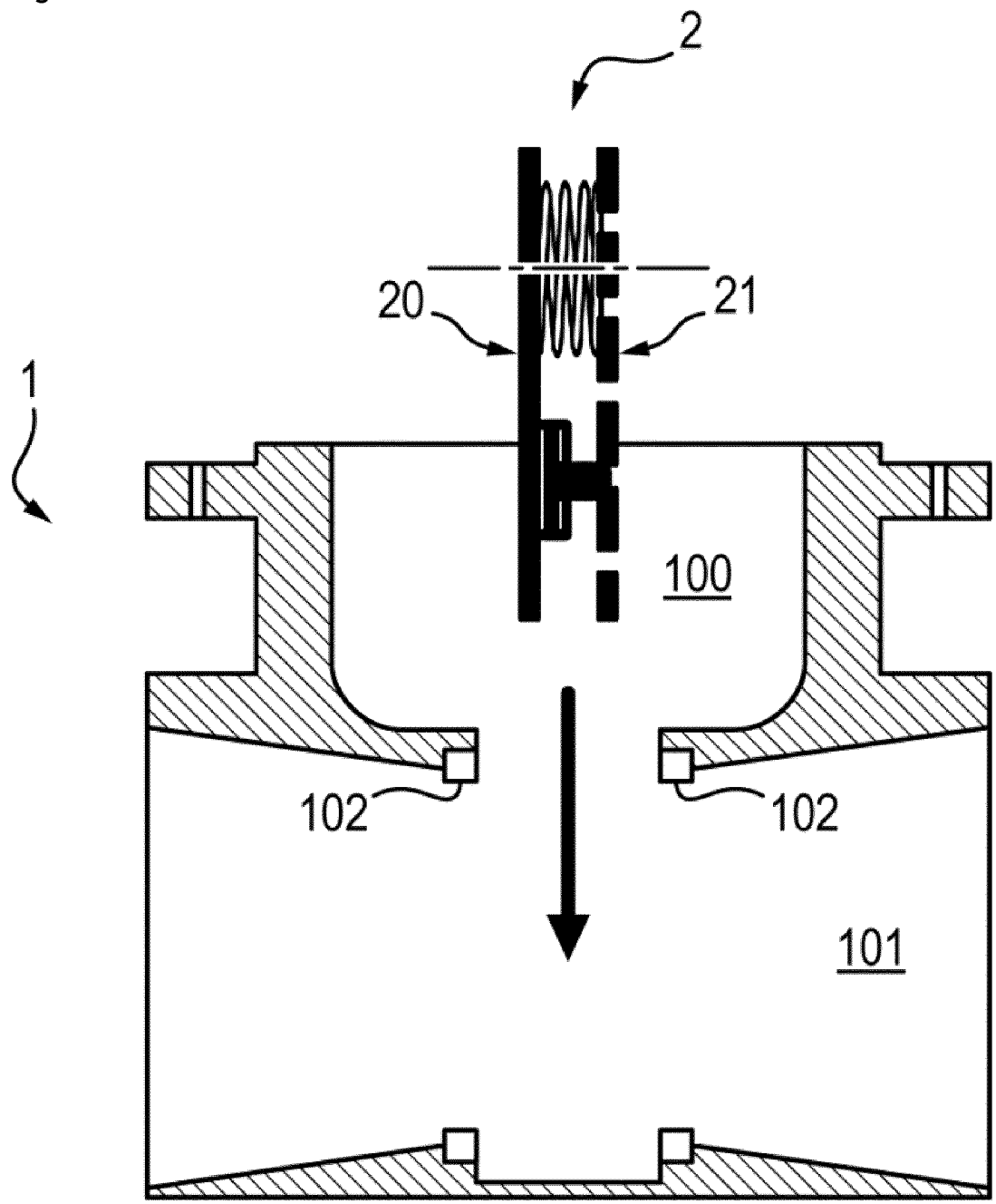
FIG. 9 is a first diagram intended to explain how the shut-off member of FIGS. 2 to 4 is put in place inside the valve structure to test.
Figure 11:
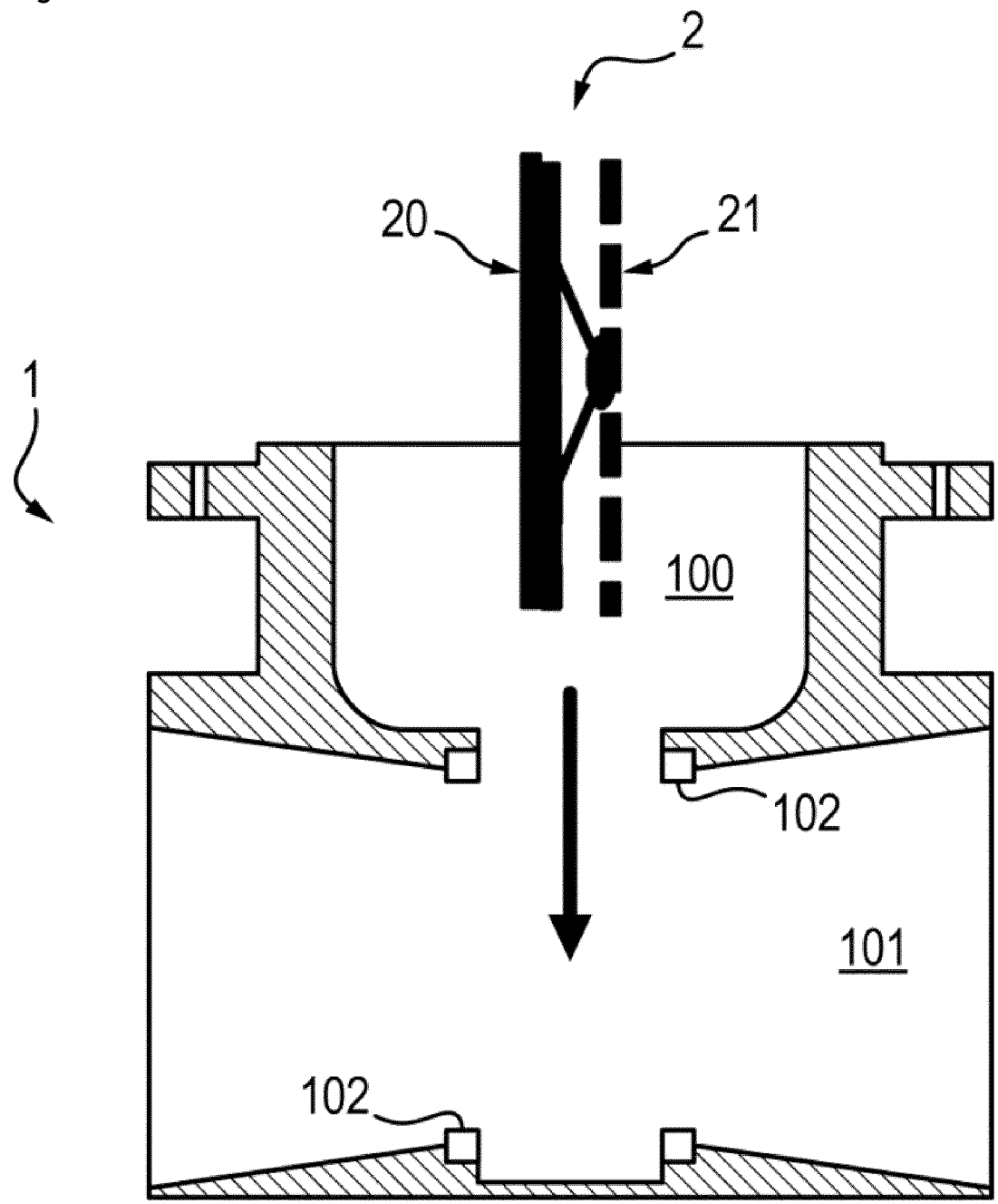
FIG. 11 is a first diagram intended to explain how the shut-off member of FIGS. 5 to 8 is put in place inside the valve structure to test.

This is what is represented in the appended FIGS. 9 and 11, which show that after having stripped the valve 1 of its bonnet 11, it is possible to introduce therein through the space 100, said shut-off member 2, then to displace it according to a descending movement of vertical orientation, facing the seats 102. It will be arranged so that their dimensioning enables the putting in place in valve bodies of which the inter gate spaces are restricted.

Figure 10:
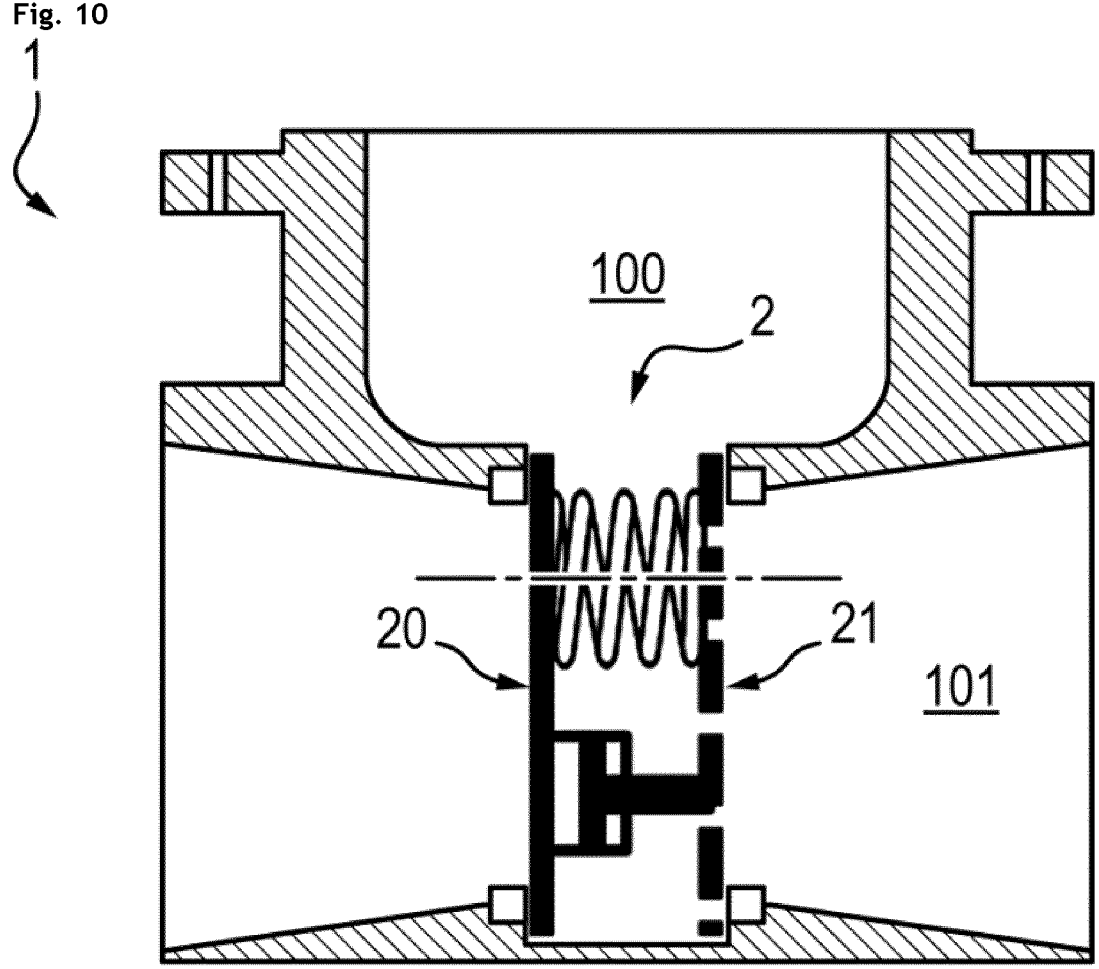
FIG. 10 is a second diagram intended to explain how the shut-off member of FIGS. 2 to 4 is put in place inside the valve structure to test.
Figure 12:
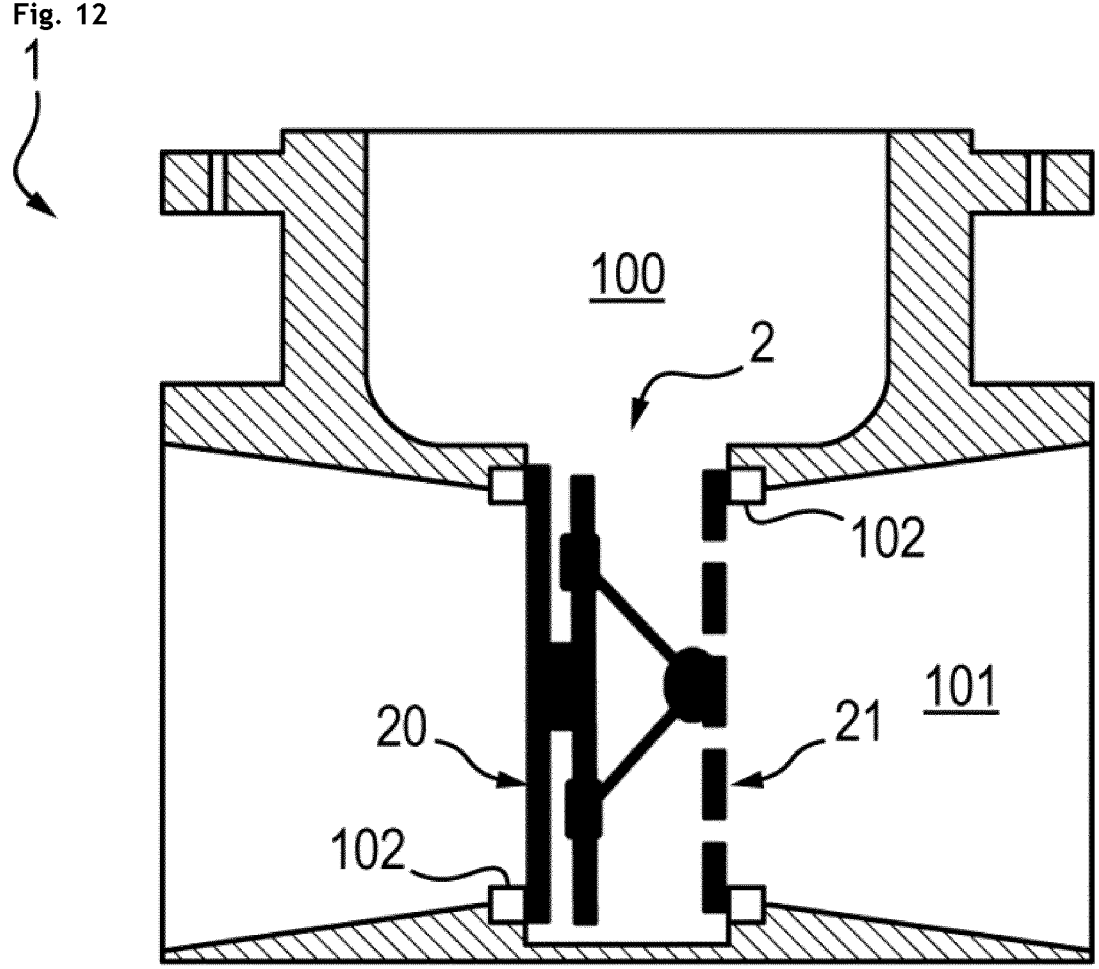
FIG. 12 is a second diagram intended to explain how the shut-off member of FIGS. 5 to 8 is put in place inside the valve structure to test.

Once in position, the shut-off member 2 may be controlled so that the distance between the plates 20 and 21 increases, until the plates 20 and 21 bear on the seats 102 of the valve 1, until the perfect leak tightness necessary for the hydraulic proof test is obtained (see FIGS. 10 and 12). Once in position, leak tightness is guaranteed without requiring control or adjustment in service.

Obviously, the seals that equip the plates 20 and 21 make it possible to protect the seats 102 of the valve 1, the seal of the solid plate 20 being designed to hug the corresponding seat, thus guaranteeing leak tightness in all circumstances. This seal makes it possible to absorb potential surface inequalities.

As specified above in the present description, the assembly according to the present invention furthermore comprises a device for inserting and supporting said shut-off member 2 inside the valve 1.

Figure 13:
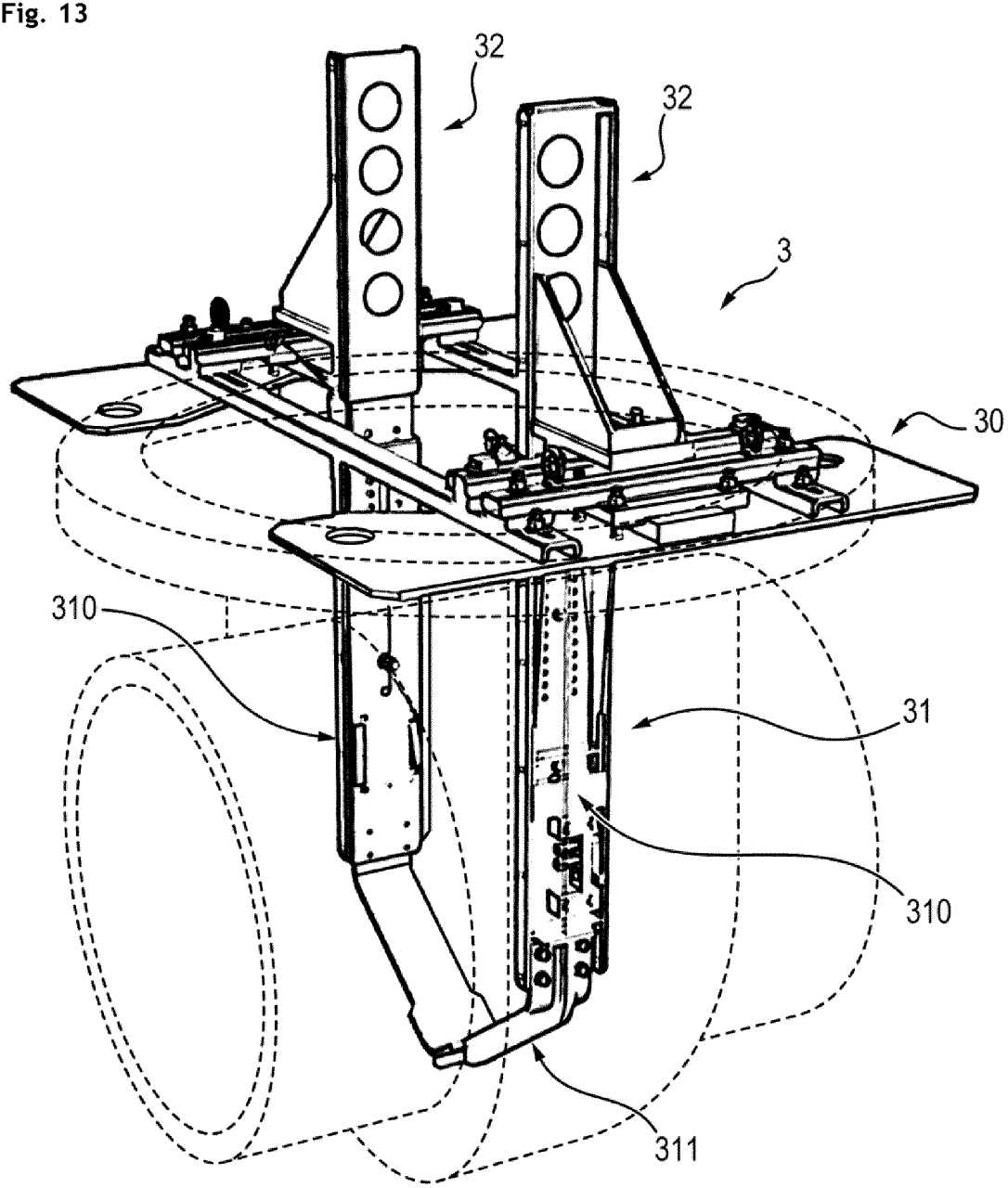
FIG. 13 is a first view showing, in perspective, a device for inserting and supporting the shut-off member with parallel plates which forms part of the assembly according to the present invention.
Figure 14:
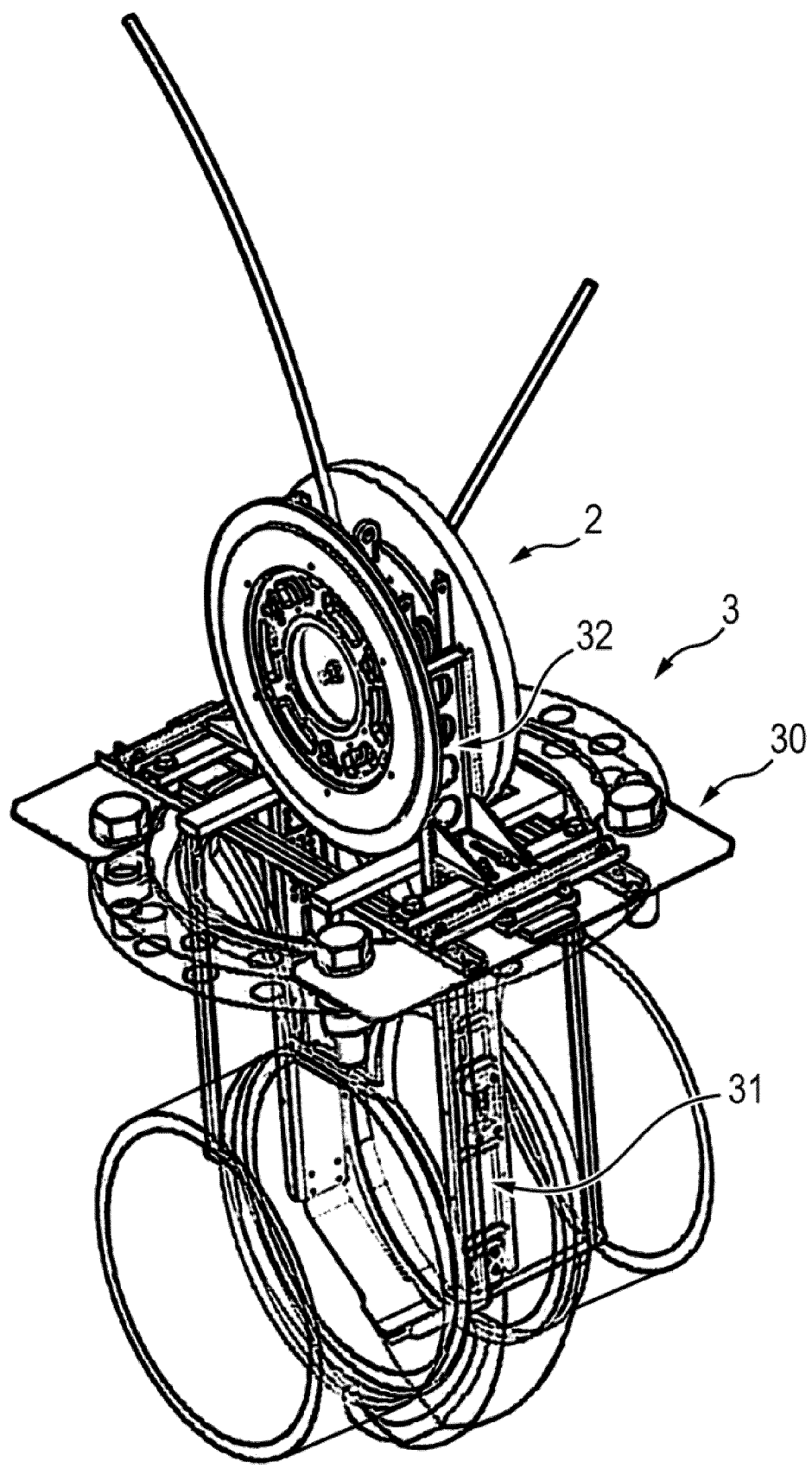
FIG. 14 is a second view showing the device of the preceding figure, said shut-off member being in its initial position in FIGS. 3 and 7, before lowering into the valve structure.
Figure 15:
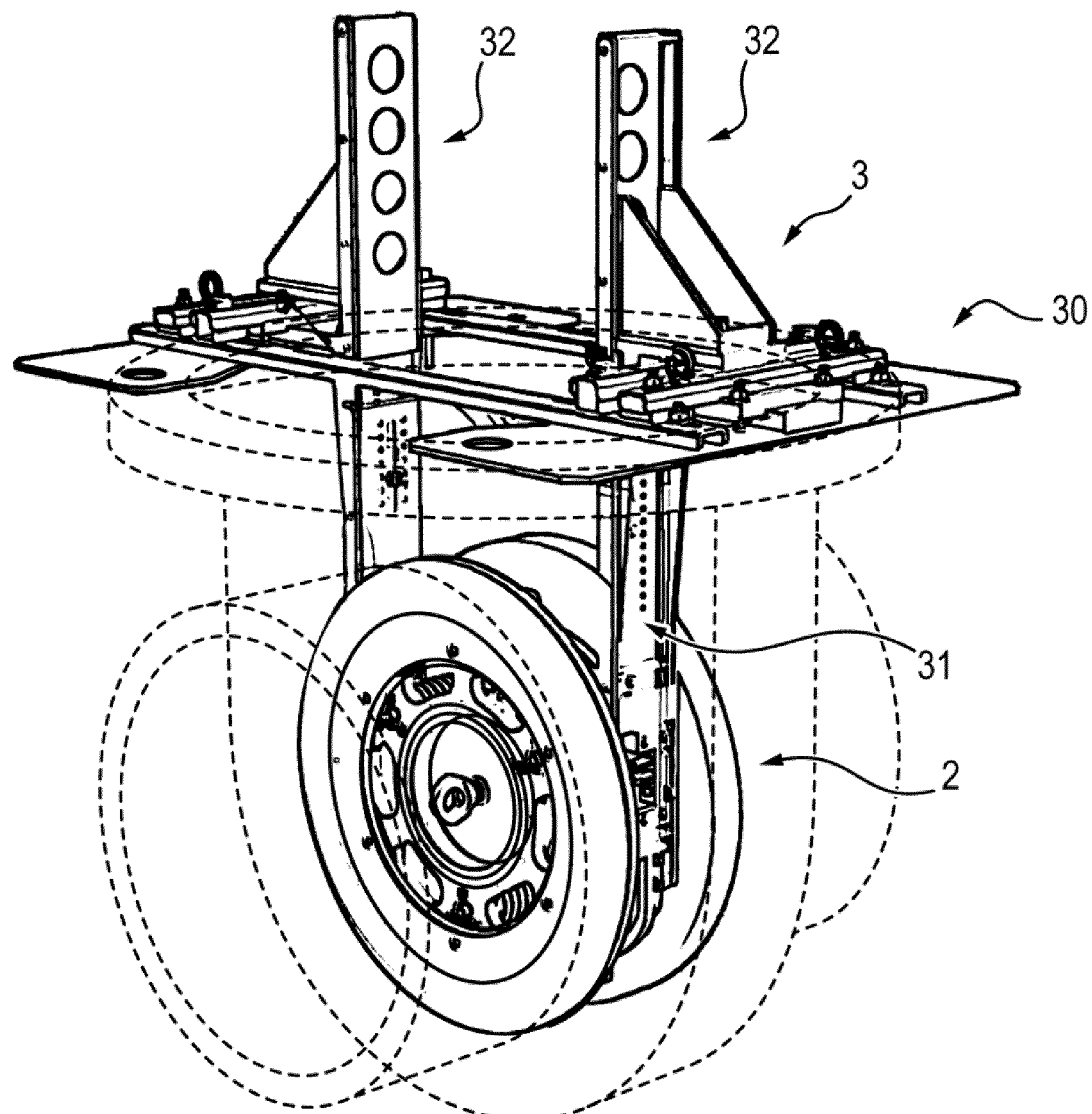
FIG. 15 is a third view showing the device of FIG. 13, said shut-off member being in its final position.

Reference will be made more specifically to FIGS. 13 to 15 to describe a possible embodiment of this device 3.

In the embodiment described here, the device 3 comprises an "external tool" 30 intended to bear on the seal plane 112 of the bonnet 11 of the valve 1, while leaving accessible the whole of the access to the space 100. This tool, which can be qualified as platform, has for vocation to be dismantled before closing of the valve (refitting of the bonnet 11) to conduct the hydraulic proof test.

The insertion device 3 also comprises, as indicated above, an "inner tool" 31.

As is clearly visible in the appended figures, this tool 31 has a general "U" shape and is configured to be introduced into the valve 1, the parallel arms 310 of this "U" shaped tool forming guides for the introduction and the removal of the shut-off member 2, while its base 311 forms a support for retaining said shut-off member 2 with a view to the application of its parallel plates 20 and 21 against the parallel seats 102 of the valve. Although it is not visible in the figures, at least one wedge is positioned between the shut-off member and the tool 31 to achieve the centring of the shut-off member.

Obviously, the tool 31 comprises fastening means which make it possible to make it integral with the external tool 30.

Finally, the device 3 comprises a pair of external guiding extensions 32, configured to be positioned on the "external tool" 30, in the continuation of the arms 310 of the "inner tool" 31.

In order to put the shut-off member 2 in place in the valve 1, said shut-off member is positioned between the extensions 32 (see FIG. 14) and progressively lowered down to the base of the inner tool 31, which makes it possible to slide the shut-off member to its final position. Once in place, the shut-off member 2 is expanded to obtain leak tightness. An automatic locking system makes it possible to make the shut-off member 2 and the inner tooling 31 integral. The inner tooling 31 remains in place in the valve during the hydraulic proof test, the external tool 30 and the external extensions 32 being dismantled. It will be extracted jointly with the shut-off member 2 when the hydraulic proof test has finished. It is provided so as not to hinder the conducting of the hydraulic proof test.

Once the shut-off member is in place, it is necessary to reposition the bonnet 11 of the valve 1, and to provide a "dummy stem" to replace the original stem of the valve 1, so as to ensure leak tightness at the level of the bonnet and, if necessary, the venting of the circuit.

Figure 16:
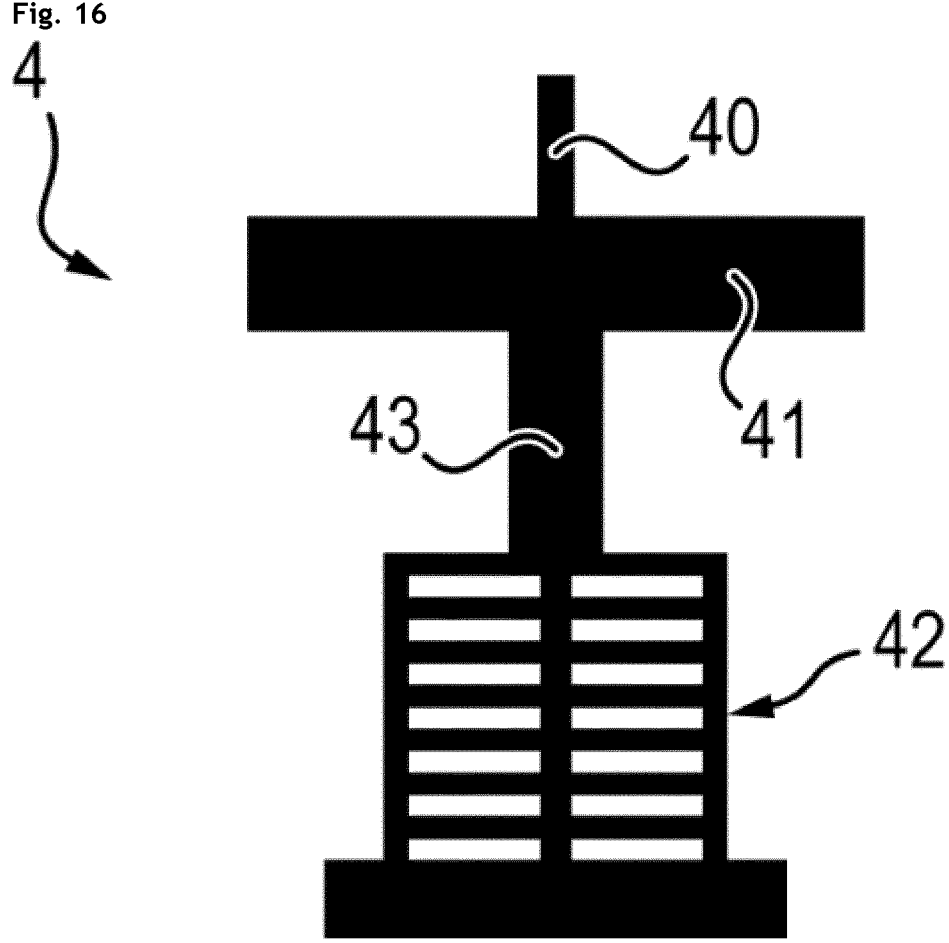
FIG. 16 is a schematic view of a first embodiment of a "dummy stem" which forms part of the assembly according to the present invention.
Figure 17:
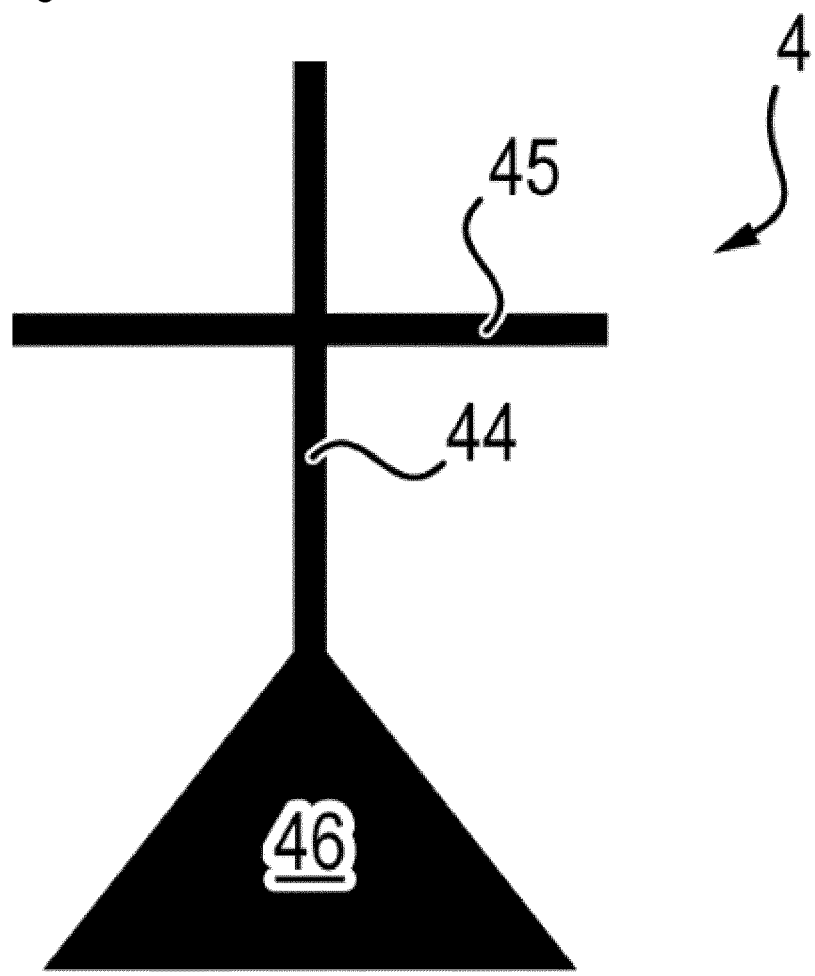
FIG. 17 is a schematic view of a second embodiment of a "dummy stem" which forms part of the assembly according to the present invention.

Thus, the assembly of the invention comprises such a "dummy stem" of which two alternative embodiments are represented schematically in FIGS. 16 and 17.

This dummy stem is preferentially suited to all parallel seat valve technologies and thus adapts to the dimensions of the different bonnets and to the range of test pressures. A venting function is provided which may if necessary be blocked for maintenance type requirements not requiring this functionality. A pressure, temperature or other measurement type instrumentation may also be envisaged via this dummy stem.

In the embodiment presented in FIG. 16, it is a dummy stem 4 of gland type.

It is composed:
of a hollow stem 40 forming a vent line and making it possible to fulfil the venting function of the tooling;
of steel washers and rubber seals (preferably EPDM (ethylene-propylene-diene monomer)) 42 which are compressed to enable the sealing of the dummy stem during the hydraulic proof test,
of a follower 41 and supporting washers 43 to enable the maintaining in position of the aforesaid washers and seals.

In the embodiment shown in FIG. 17, it is a dummy stem 4 of autoclave type.

This dummy stem is composed of:
a venting valve placed on a hollow and threaded stem 44;
a clamping washer 45;
a sealing cone 46, for example made of Teflon (registered trademark) operating by autoclave effect.

The cone is put in place with a slight tightening guaranteeing leak tightness during filling at atmospheric pressure, the increase in pressure in the body of the valve making it possible to apply a greater force on the cone and thus guaranteeing leak tightness at the test pressure.

The shut-off device 2 and its dummy stem 4 are dimensioned for a very wide test pressure range (up to 250 bars), making it possible at least to cover the needs of the equipment and capacities of French nuclear power plants.

Figure 18:
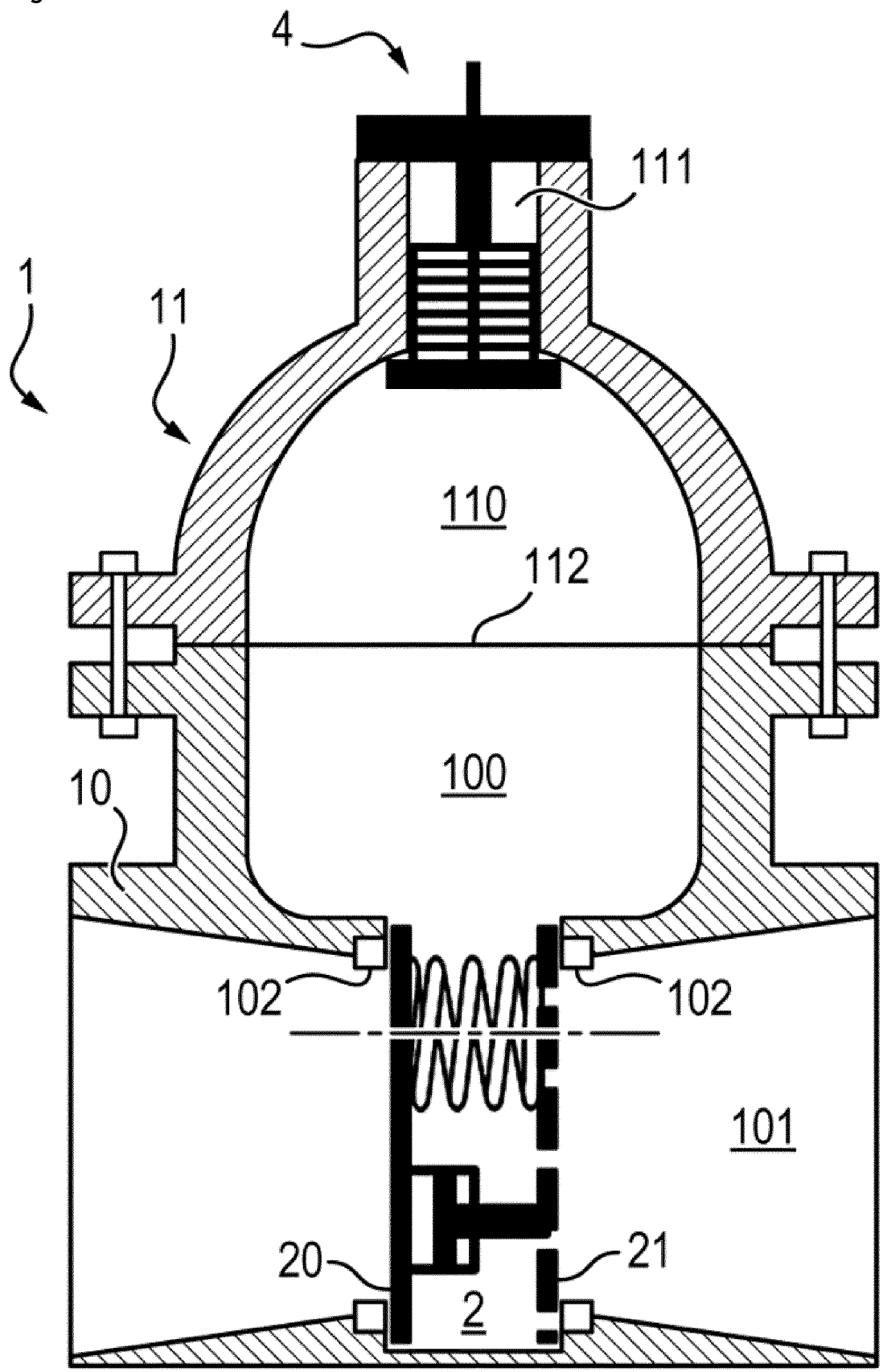
FIG. 18 is a schematic view showing the valve structure of FIG. 1 during a hydraulic proof test by means of a first alternative of the assembly according to the present invention.
Figure 19:
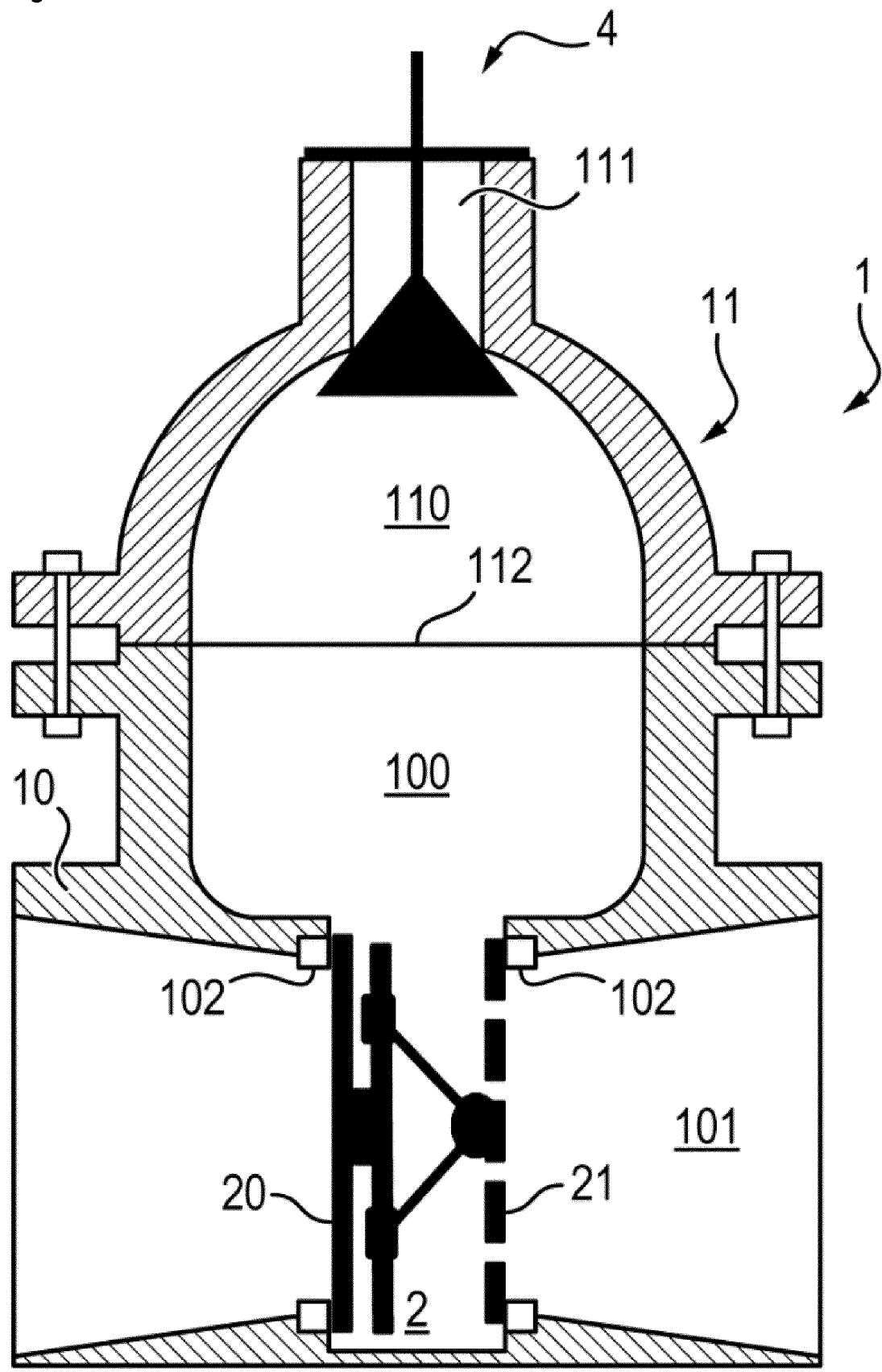
FIG. 19 is a view showing the valve structure of FIG. 1 during a hydraulic proof test by means of a second alternative of the assembly according to the present invention.

Reference will be made to FIGS. 18 and 19 to visualise the emplacements of the shut-off member 2 and the dummy stem 4 during the hydraulic proof test.

This assembly has been designed for hydraulic proof tests of exchangers and capacities of the conventional island of nuclear power plants. However, it may be used on all valves with parallel seats needing to be shut off, whether it is for maintenance operations or tests, trials or hydraulic proof tests in any type of industry (chemicals, petrochemicals, gas, etc.).

In the particular case of hydraulic proof tests of exchangers and capacities of French nuclear power plants, the following advantages are highlighted:
The putting in place of the tooling is simple, it does not require particular skills other than the basic skills required within the context of hydraulic proof tests. It does not require either undergoing specific training, an operating manual being provided for the intervention;
An intervener can put in place the tooling alone in complete safety, which makes it possible to optimise the resources mobilised on the activity. For valves of large dimensions, the insertion device enables the putting in place of the tooling with the same advantages whatever the configuration of the valve (vertical or inclined);
The dummy stem makes it possible to expel the air trapped in the pipe which guarantees pressure stability in the bubble;
The use of this tooling brings economic savings with respect to the solutions currently implemented which are internal interventions of valves or the putting in place of welded shut-off devices.
The use of this tooling also makes it possible to reduce the planning of the activity with respect to the carrying out of welding works, the return to compliance of the equipment being faster.
Its use does not require any energy source, of any type, during pressure resistance tests, making its exploitation autonomous.

The invention claimed is:

1. Assembly for conducting a hydraulic proof test, which is a pressure resistance test, of a hydraulic installation which comprises a valve with parallel seats, a body of this valve having been stripped beforehand of its actuating stem, its parallel gates and a bonnet supporting said actuating stem, thus freeing an opening for accessing said parallel seats, wherein said assembly comprises:
a shut off member with parallel plates, one of said parallel plates being apertured and an other of said parallel plates being solid, said parallel plates being connected by connecting means making it possible to regulate their mutual separation, so as to be able to make them go from a first position, which is a retracted position in which this mutual separation is sufficient to enable the introduction of said shut off member into said valve via said opening, to a second position, which is an expanded position, in which said mutual separation is greater than that of said parallel plates in said first position, said mutual separation making it possible to apply said parallel plates firmly against said parallel seats-;
a device for inserting and supporting said shut off member inside said valve, wherein said device comprises an inner tool which has a general "U" shape and is configured to be introduced into said valve, parallel arms of said inner tool forming guides for introduction and removal of said shut-off member, while a base of the inner tool forms a support for retaining said shut-off member, allowing a view of the application of its parallel plates against said parallel seats;
a dummy stem, which is a sealing equipment configured to close said valve in a leak tight manner after putting said bonnet back in place on said body.

2. Assembly according to claim 1, wherein said parallel plates are capable of being dismantle and interchanged.

3. Assembly according to claim 1, wherein said connecting means connecting said parallel plates of said shut-off member comprise a spring configured to bring said parallel plates into said second position, and a jack controllable on demand, to force said parallel plates to occupy said first position against an action of said spring.

4. Assembly according to claim 1, wherein said connecting means connecting said parallel plates of said shut-off member comprise a spring configured to bring said parallel plates into said first position and a jack controllable on demand, to force said parallel plates to occupy said second position against an action of said spring.

5. Assembly according to claim 1, wherein said dummy stem is a gland or an autoclave.

6. Assembly according to claim 1, wherein said dummy stem is provided with a vent line.

7. Assembly according to claim 1, wherein said dummy stem is provided with instrumentation means.

8. Assembly according to claim 1, wherein said connecting means connecting said parallel plates of said shut-off member comprise a set of connecting rods hinged on a first plate and on a second plate of said parallel plates.

9. Assembly according to claim 8, wherein each connecting rod of said set of connecting rods is hinged on one of said parallel plates via a sliding pivot link.

10. Assembly according to claim 1, wherein said device for inserting and supporting said shut off member also comprises an external tool; configured to be positioned on a seal plane of said bonnet, around said opening and to enable the centering of said inner tool.

11. Assembly according to claim 10, wherein said device for inserting and supporting said shut off member also comprises a pair of external guiding extensions, configured to be positioned on said external tool; in continuation of the parallel arms of said inner tool.

* * * * *